March 26, 1929.  O. C. REEVES  1,706,963
SCALE FRAME PART
Filed July 27, 1925
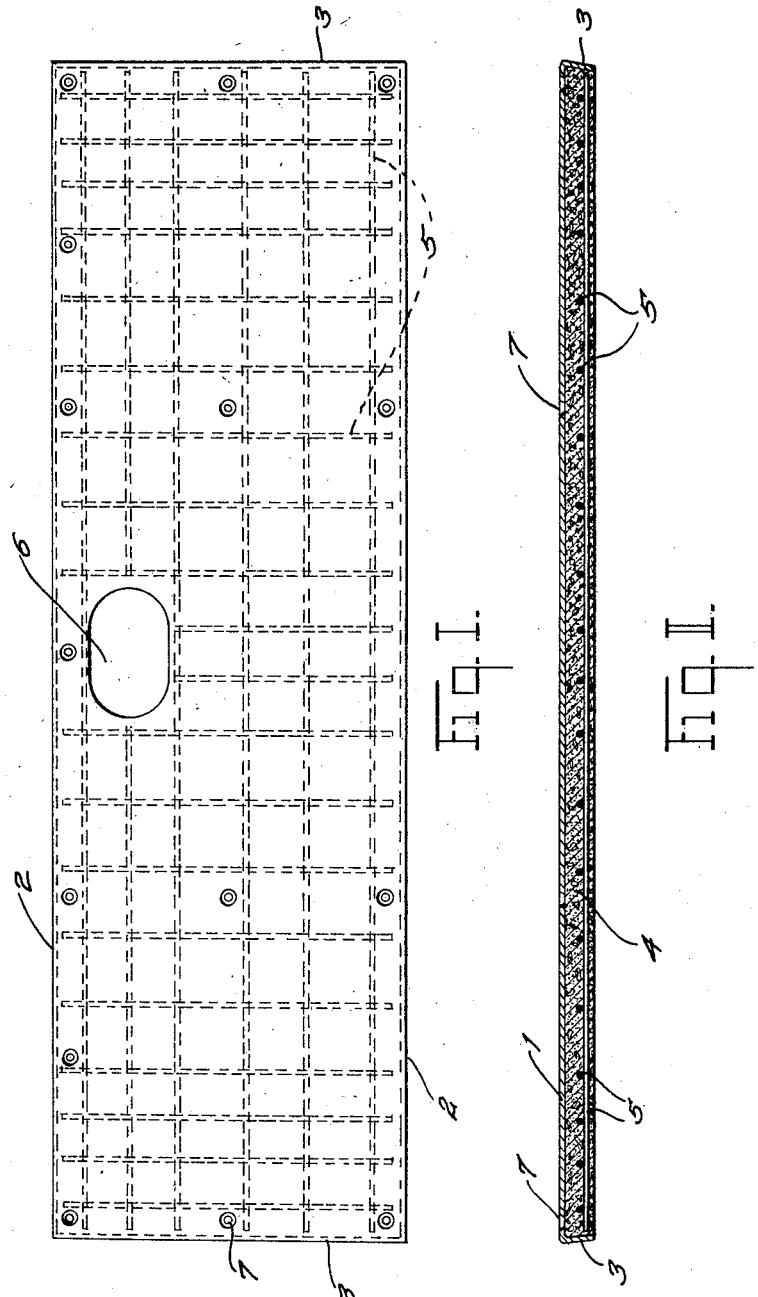
Inventor
Orwell C. Reeves.

Patented Mar. 26, 1929.

1,706,963

UNITED STATES PATENT OFFICE.

ORWELL C. REEVES, OF TOLEDO, OHIO, ASSIGNOR TO TOLEDO SCALE COMPANY, OF TOLEDO, OHIO, A CORPORATION OF NEW JERSEY.

SCALE-FRAME PART.

Application filed July 27, 1925. Serial No. 46,376.

The invention covered by this application relates to frames of weighing scales, and particularly to the part of a weighing scale frame upon which is supported the column or cabinet that supports the load-counterbalancing and indicating mechanism. This part of the scale frame is usually called the deck, and it is the principal object of this invention to provide a rigid deck structure which may be made of inexpensive material and without the use of special machinery.

Another object is to provide a rigid deck adapted to so support the load-counterbalancing and indicating mechanism of the scale that the accuracy of the scale is not affected by deflection in the deck resulting from the weight of the operator or from other loads being placed upon it.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a plan view of the deck portion of a weighing scale frame embodying my invention; and Figure II is a longitudinal sectional view of the deck shown in Figure I.

In the embodiment shown the upper face 1 and the lateral sides 2 and ends 3 of the deck are composed of a single piece of sheet metal, the edges of the sheet being turned downwardly and slightly inwardly to form the sides 2 and ends 3.

The body of the deck is formed of reinforced concrete 4.

In constructing the deck the piece of sheet metal which forms the top, lateral sides and ends of the deck is turned upside down and the concrete is poured into it, the reinforcing rods 5 being placed substantially as shown. An opening 6 is provided adjacent the center of the rear side of the deck through which the connections from the platform lever mechanism of the scale to the load-counterbalancing and indicating mechanism may pass. Bolt holes 7 are provided for fastening the deck down to the other parts of the scale frame. Since the sides 2 and ends 3 of the frame extend slightly inwardly, the concrete slab 4 which forms the body of the frame and the steel sheet are securely held together.

The embodiment of my invention herein shown and described is to be regarded as illustrative only, and it is to be understood that the invention is susceptible to variation, modification and change within the spirit and scope of the subjoined claims.

Having described my invention, I claim:

1. A deck for weighing scales comprising, in combination, a sheet of metal having its edges turned downwardly to form the lateral sides and ends of such deck, the space bounded by the body of the sheet of metal and the downturned edges thereof being filled with concrete.

2. A deck for weighing scales comprising, in combination, a sheet of metal having its edges turned downwardly and slightly inwardly to form the lateral sides and ends of such deck, the space bounded by the body of the sheet of metal and the downturned edges thereof being filled with concrete.

3. A deck for weighing scales comprising, in combination, a sheet of metal having its edges turned downwardly and slightly inwardly to form the lateral sides and ends of such deck, the space bounded by the body of the sheet of metal and the downturned edges thereof being filed with concrete, and reinforcing material imbedded in said concrete.

ORWELL C. REEVES.